Jan. 27, 1925.
J. A. KJÖLBERG
1,524,182
METALLURGICAL PROCESS AND APPARATUS FOR CARRYING OUT THE SAME
Filed Aug. 26, 1921
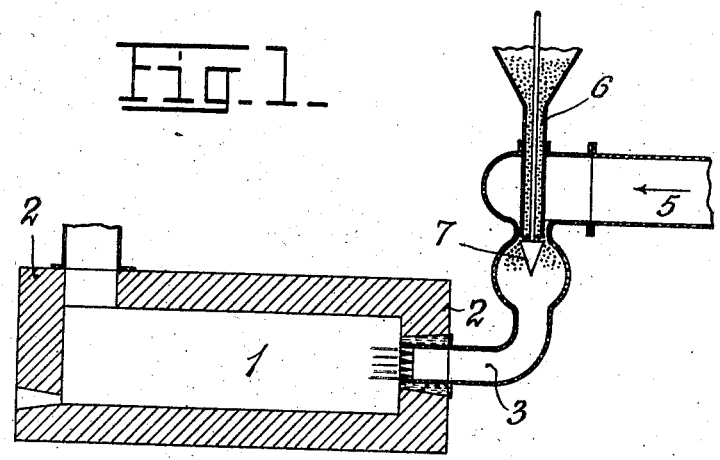
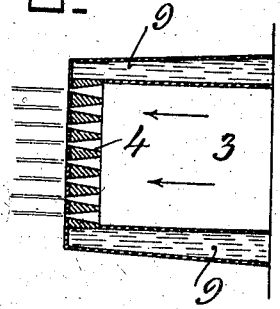
Inventor:
J. A. Kjölberg
By Lawrence Langner
Attorney Patented Jan. 27, 1925.

1,524,182

UNITED STATES PATENT OFFICE.

JENS ANDREAS KJÖLBERG, OF SVELGEN, NEAR BERGEN, NORWAY.

METALLURGICAL PROCESS AND APPARATUS FOR CARRYING OUT THE SAME.

Application filed August 26, 1921. Serial No. 495,507.

*To all whom it may concern:*

Be it known that I, JENS ANDREAS KJÖLBERG, a subject of the King of Norway, residing at Svelgen, near Bergen, Norway, have invented certain new and useful Improvements in Metallurgical Processes and Apparatus for Carrying out the Same; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to metallurgical processes of the class in which the metalliferous material to be treated is in a finely divided condition introduced into a reaction space, where it is maintained for some time suspended in a gas.

A known method of carrying metallurgical processes of this class into effect consists in supplying the powdered charge centrally at the top of a reaction chamber into which gas is blown peripherally in a tangential direction.

In another known process of the same class a preheated current of gas is blown into a reaction chamber so as to pass lengthwise through the same, the powdered charge being introduced into the path of the air current at the point where it enters the reaction chamber or burner.

In these known processes a mixing of powdered charge and gas takes place in the reaction chamber. By these means, however, it is practically impossible to obtain a complete reaction, the reaction components being liable to separate at a too early stage.

According to the present invention an improved result is obtained by producing an intimate mixture of gas and charge constituents before the charge and gas reaches the reaction chamber. For this purpose a separate mixing chamber is arranged, through which gas and powdered charge is caused to pass before entering the reaction space.

This process may be used in connection with processes for the concentration of materials as well as in connection with roasting, chlorination, reduction and other metallurgical operations. When the process is used to concentrate poor ores, for example zinc blende, the ore is first ground to a fine powder, whereupon it is blown into a heated reaction chamber through a mixing chamber by means of air or other suitable gas. In the reaction chamber the sulphur of the ore will become oxidized by the oxygen of the air. The reaction may be initiated by the arrangement of a gas flame or electrical arcs in the path of the introduced charge. This flame or arc may, however, be put out when the reaction has been initiated, the heat evolved by the oxidation of the charge being sufficient to maintain the temperature.

When the ore is of such a character that sufficient heat will not be evolved, a solid liquid or gaseous combustible is introduced into the reaction chamber. Powdered coal or coke may for example be mixed in sufficient quantity with the ore before it is blown into the furnace chamber. By suitably proportioning the combustible fusion of the gangue matter may be brought about. When zinc ores are treated, this will result in a concentration as a consequence of the fact that the gangue is fused and deposited in the reaction chamber, while the zinc oxide escapes as a vapour and may be condensed in another apparatus. The concentration of zinc ore in this manner may also be carried into effect in direct connection with the reduction to metal.

In addition to combustibles and reduction agent any other reaction means, fluxes and the like may also be introduced into the mixing chamber. When the additions consist of solid substances, they are suitably mixed with the ore in a powdered condition before being introduced into the mixing chamber.

When for example iron ore is to be reduced, it is preferred to prepare a complete charge with all of the constituents in a finely divided condition and intimately mixed and to blow this mixture into and through the mixing chamber by means of compressed air. Instead of air, carbon monoxide or other reducing gases may, however, also be used for this purpose, and the required supply of heat may be effected by any other means than by means of combustion as described. Electrical heating may for example be made use of. The charge and the gas may if desired also be preheated to a certain degree, for example by electrical heating.

An apparatus for carrying the described invention into effect is diagrammatically illustrated in the accompanying drawing, in which:

Fig. 1 is a longitudinal sectional view of the apparatus.

Fig. 2 is a sectional view of a detail on an enlarged scale.

In the illustrated example 1 is the furnace chamber, 2 is the furnace wall. 3 is a mixing chamber, 4 is a distributing device in the supply nozzle 8, 5 is a pipe for the supply of gas, 6 is a channel for the supply of the charge and 7 is a slowly rotating valve which controls the supply of charge. The nozzle 8 is surrounded by a water jacket 9.

I claim:

1. A method of treating ores comprising producing an intimate mixture of an ore in a finely powdered condition with a gas in a mixing chamber, maintaining the mixture in a whirling motion, and projecting the mixture into a heated reaction space through constricted discharge openings.

2. A method according to claim 1 in which the ore is projected into the mixing chamber by jets of compressed air entering the mixing chamber through constricted discharge openings so as to be allowed to expand at the moment of its discharge into the mixing chamber.

3. A method of roasting and concentrating ores of zinc and other metals comprising producing an intimate mixture of finely powdered charged components comprising ore and a carbonaceous material and compressed air in a mixing chamber, maintaining the mixture of gas and powdered charge in a whirling motion in the mixing chamber, and projecting the mixture into a heated furnace chamber through constricted discharge openings.

4. An apparatus for carrying out the method of claim 1 comprising in combination a mixing chamber, a narrow opening therein, means for supplying compressed air to the mixing chamber through the narrow opening, means for supplying powdered ore into the path of the supplied compressed air and a separate reaction chamber communicating with the mixing chamber through narrow openings, through which the mixture of gas and powder can be projected from the mixing chamber into the reaction chamber.

5. An apparatus for carrying out the method of claim 1 comprising, in combination, a mixing chamber, a narrow opening therein, means for supplying compressed air to the mixing chamber through the narrow opening, means for supplying powdered ore into the path of the supplied compressed air, a reaction chamber, a wall separating the mixing chamber from the said reaction chamber, the separating wall being provided with a plurality of holes through which the mixture of gas and powder can be projected into the reaction chamber in the form of expanding jets.

In testimony that I claim the foregoing as my invention, I have signed my name in the presence of two subscribing witnesses.

JENS ANDREAS KJÖLBERG.

Witnesses:
 ERNEST F. HODGE,
 JOHN NUAWINE.